US012668884B2

(12) United States Patent　(10) Patent No.: US 12,668,884 B2
Liu et al.　(45) Date of Patent: Jun. 30, 2026

(54) COMPOSITE PROTON EXCHANGE MEMBRANE AND CATALYST-COATED COMPOSITE PROTON EXCHANGE MEMBRANE

(71) Applicant: UOP LLC, Des Plaines, IL (US)

(72) Inventors: Chunqing Liu, Arlington Heights, IL (US); Zhihao Shang, Mount Prospect, IL (US); Xueliang Dong, Schaumburg, IL (US); Dennis F. van der Vliet, Skokie, IL (US)

(73) Assignee: UOP LLC, Des Plaines, IL (US)

( * ) Notice: Subject to any disclaimer, the term of this patent is extended or adjusted under 35 U.S.C. 154(b) by 565 days.

(21) Appl. No.: 18/340,200

(22) Filed: Jun. 23, 2023

(65) Prior Publication Data

US 2024/0426008 A1　Dec. 26, 2024

(51) Int. Cl.
*C25B 13/02*　(2006.01)
*C25B 9/23*　(2021.01)
(Continued)

(52) U.S. Cl.
CPC ............... *C25B 13/02* (2013.01); *C25B 9/23* (2021.01); *C25B 11/052* (2021.01); *C25B 11/077* (2021.01); *C25B 11/081* (2021.01); *C25B 13/07* (2021.01); *C25B 13/08* (2013.01); *H01M 4/926* (2013.01); *H01M 8/1004* (2013.01); *H01M 8/1039* (2013.01); *H01M 2008/1095* (2013.01)

(58) Field of Classification Search
CPC ............. H01M 8/1004; H01M 8/1023; H01M 8/1025; H01M 8/1039; H01M 8/1051; H01M 8/1053; H01M 8/1081; H01M 2008/1095; H01M 2300/0094; Y02E 60/50; C25B 9/23; C25B 11/052; C25B 11/077; C25B 11/081; C25B 13/02; C25B 13/07; C25B 13/08
See application file for complete search history.

(56) References Cited

U.S. PATENT DOCUMENTS

| 4,931,182 A | 6/1990 | Burgoyne, Jr. et al. |
| 7,485,173 B1 | 2/2009 | Liu et al. |

(Continued)

FOREIGN PATENT DOCUMENTS

| CN | 102867928 A | 1/2013 |
| CN | 102935389 A | 2/2013 |

(Continued)

OTHER PUBLICATIONS

International Search Report from corresponding PCT application No. PCT/US2024/034018, mailed Sep. 30, 2024.

(Continued)

*Primary Examiner* — C. Sun

(57) ABSTRACT

Composite proton exchange membranes are described. The composite proton-exchange membranes comprise three layers including a proton exchange membrane layer, a continuous nonporous organic-inorganic composite coating layer, and a continuous nonporous cross-linked polyelectrolyte multilayer coating. Catalyst coated membranes incorporating the composite proton exchange membranes and methods of making the composite proton exchange membranes are also described.

20 Claims, 4 Drawing Sheets

(51) Int. Cl.

| | |
|---|---|
| *C25B 11/052* | (2021.01) |
| *C25B 11/077* | (2021.01) |
| *C25B 11/081* | (2021.01) |
| *C25B 13/07* | (2021.01) |
| *C25B 13/08* | (2006.01) |
| *H01M 4/92* | (2006.01) |
| *H01M 8/10* | (2016.01) |
| *H01M 8/1004* | (2016.01) |
| *H01M 8/1039* | (2016.01) |

(56) References Cited

U.S. PATENT DOCUMENTS

| | | | |
|---|---|---|---|
| 9,457,324 B2 | 10/2016 | Bahar et al. | |
| 9,580,824 B2 | 2/2017 | Masel et al. | |
| 10,418,646 B2 | 9/2019 | Moon et al. | |
| 10,435,504 B2 | 10/2019 | Bae et al. | |
| 10,833,307 B2 | 11/2020 | Xu et al. | |
| 2005/0053818 A1* | 3/2005 | St-Arnaud | B01D 61/243 |
| | | | 429/493 |
| 2005/0268783 A1 | 12/2005 | Koros et al. | |
| 2009/0178561 A1 | 7/2009 | Miller et al. | |
| 2009/0182097 A1 | 7/2009 | Miller et al. | |
| 2009/0197138 A1* | 8/2009 | Hammond | H01M 8/1011 |
| | | | 427/58 |
| 2012/0183877 A1 | 7/2012 | Houghtaling et al. | |
| 2015/0140439 A1 | 5/2015 | Hasegawa | |
| 2015/0299878 A1* | 10/2015 | Hamrock | B01D 69/122 |
| | | | 429/482 |
| 2017/0317370 A1 | 11/2017 | Kang et al. | |
| 2018/0351192 A1 | 12/2018 | Lee et al. | |
| 2019/0181461 A1 | 6/2019 | Weber et al. | |
| 2019/0185600 A1 | 6/2019 | Saito et al. | |
| 2020/0017980 A1 | 1/2020 | Lewinski et al. | |
| 2020/0168937 A1* | 5/2020 | Ahn | H01M 8/1032 |
| 2020/0308341 A1 | 10/2020 | Yan et al. | |
| 2020/0330929 A1 | 10/2020 | Wang et al. | |
| 2022/0134292 A1* | 5/2022 | Liu | H01M 50/414 |
| | | | 429/249 |
| 2022/0243019 A1 | 8/2022 | Liu et al. | |
| 2023/0123137 A1 | 4/2023 | Liu et al. | |

FOREIGN PATENT DOCUMENTS

| | | | |
|---|---|---|---|
| CN | 104923092 A | 9/2015 | |
| CN | 105107393 A | 12/2015 | |
| CN | 106099147 A | 11/2016 | |
| CN | 110862516 A | 3/2020 | |
| CN | 110903449 A | 3/2020 | |
| CN | 112175170 A | 1/2021 | |
| CN | 113583279 A | 11/2021 | |
| EP | 0624283 A1 | 11/1994 | |
| EP | 2590250 A1 | 5/2013 | |
| JP | H06260183 A | 9/1994 | |
| JP | 201618140 A | 12/2016 | |
| KR | 10-1546651 B1 | 8/2015 | |
| KR | 20180003925 A | 1/2018 | |
| KR | 20200061101 A | 6/2020 | |
| KR | 20210071810 A | 6/2021 | |
| WO | 9315529 | 8/1993 | |
| WO | 2009147084 A1 | 12/2009 | |
| WO | 2016132249 A1 | 8/2016 | |
| WO | 2016182889 A1 | 11/2016 | |
| WO | 2017190234 A1 | 11/2017 | |
| WO | 2018185615 A1 | 10/2018 | |
| WO | 2019076860 A1 | 4/2019 | |
| WO | 2019225873 A1 | 11/2019 | |
| WO | 2020240585 A1 | 12/2020 | |
| WO | 2021004811 A1 | 1/2021 | |
| WO | 2022002904 A1 | 1/2022 | |
| WO | 2022002999 A1 | 1/2022 | |

OTHER PUBLICATIONS

Written Opinion from corresponding PCT application No. PCT/US2024/034018, mailed Sep. 30, 2024.

Chen, Chien-Chiang et al., Plasticization-resistant hollow fiber membranes for CO2/CH4 separation based on a thermally crosslinkable polyimide, Journal of Membrane Science 382 (2011) 212-221.

Liu, Ye et al., Chemical cross-linking modification of polyimide membranes for gas separation, Journal of Membrane Science 189 (2001) 231-239.

Wang, Junhua et al., Poly(arly piperidinium) membranes and ionmers for hydroxide exchange membrane fuel celles, Nature Energy, https://doi.org/10.1038/s41560-019-0372-8.

Liu, Chunqing et al., U.S. Appl. No. 17/388,950, filed Jul. 29, 2021, entitled Ionically Conductive Asymmetric Composite Membranes for Electrochemical Energy Storage Applications.

Liu, Chunqing et al., U.S. Appl. No. 17/388,956, filed Jul. 29, 2021, entitled Sandwich-Structured Thin Film Composite Anion Exchange Membrane for Redox Battery Applications.

Liu, Chunqing et al., U.S. Appl. No. 17/389,032, filed Jul. 29, 2021, entitled Ionically Conductive Thin Film Composite Membranes for Energy Storage Applications.

Liu, Chunqing et al., U.S. Appl. No. 17/388,962, filed Jul. 29, 2021, entitled Electrolyte Compositions for Redox Flow Batteries.

Ba, Chaoyi, et al., U.S. Appl. No. 17/474,198 filed Sep. 14, 2021, entitled Anion Exchange Polymers and Membranes for Electroylsis.

Ryu, T. et al., Synthesis and characterization of block copolymer and comparative study with random copolymer via superacid-catalyzed reaction, International journal of hydrogen energy, 2018, vol. 43, pp. 11862-11871.

Lee, S. et al., Synthesis and properties of sulfonated poly(N-methylisatin-biphenylene) proton exchange membrane by superacid-catalyzed polymerization, International journal of hydrogen energy, 2015, vol. 40, pp. 5390-5395.

Frank Schönberger et al., Novel Multiblock-co-Ionomers as Potential Polymer Electrolyte Membrane Materials, Wiley InterScience, Jun. 2007, DOI: 10.1002/pola.22269.

Muthumeenal Arunachalam et al., High Performance of Anion Exchange Blend Membranes Based on Novel Phosphonium Cation Polymers for All-Vanadium Redox Flow Battery Applications, ACS Appl. Mater. Interfaces, 2021, 13, 45935-45943.

Chengji Zhao et al., Layer-by-layer self-assembly of polyaniline on sulfonated poly(arylene ether ketone) membrane with high proton conductivity and low methanol crossover, International Journal of Hydrogen Energy 35 (2010), 10482-10488.

Yuyue Zhao et al., The porous membrane with tunable performance for vanadium flow battery: The effect of charge, Journal of Power Sources, 342, (2017), 327-334.

Shanfu Lu et al., Layer-by-layer self-assembly of Nafion-[CS-PWA] composite membranes with suppressed vanadium ion crossover for vanadium redox flow battery applications, RSC Adv., 2014, 4, 24831.

Ying-Chih Lin et al., Preparation of cellulose acetate/PP composite membrane for vanadium redox flow battery applications, Rare Metals, vol. 30, Spec. Issue, Mar. 2011, p. 22.

M. Skyllas-Kazacos et al., Redox flow batteries for medium-to-large scale energy storage, DOI:10.1533/9780857097378.3.398.

Lutkennhaus, Jodie L. et al., Electrochemically enabled polyelectrolyte multilayer devices: from fuel cells to sensors, Soft Matter, 2007, 3, 804-816.

White, Nicholas et al., Coating of Nafion Membranes with Polyelectrolyte Multilayers to Achieve High Monovalent/Divalent Cation Electrodialysis Selectivities, ACS Appl. Mater. Interfaces 2015, 7, 6620-6628.

Liu, Chunqing, et al., U.S. Appl. No. 63/509,806, filed Jun. 23, 2023, entitled Proton Exchange Membrane and Catalyst-Coated Proton Exchange Membrane.

* cited by examiner

COMPOSITE PROTON EXCHANGE MEMBRANE AND CATALYST-COATED COMPOSITE PROTON EXCHANGE MEMBRANE

BACKGROUND

Hydrogen as an energy vector for grid balancing or power-to-gas and power-to-liquid processes plays an important role in the path toward a low-carbon energy structure that is environmentally friendly. Water electrolysis produces high quality hydrogen by electrochemical splitting water into hydrogen and oxygen; the reaction is given by Eq. 1 below. The water electrolysis process is an endothermic process and electricity is the energy source. Water electrolysis has zero carbon footprint when the process is powered by renewable energy sources, such as wind, solar, or geothermal energy. The main water electrolysis technologies include alkaline electrolysis, proton exchange membrane (PEM) water electrolysis (PEMWE as shown in FIG. 1), anion exchange membrane (AEM) water electrolysis (AEMWE as shown in FIG. 2), and solid oxide water electrolysis.

As shown in FIG. 1, in a PEMWE system 100, an anode 105 and a cathode 110 are separated by a solid PEM electrolyte 115, such as a sulfonated tetrafluoroethylene based cofluoropolymer sold under the trademark Nafion® by Chemours company. The anode and cathode catalysts typically comprise $IrO_2$ and Pt, respectively. At the positively charged anode 105, pure water 120 is oxidized to produce oxygen gas 125, electrons (e), and protons; the reaction is given by Eq. 2. The protons are transported from the anode 105 to the cathode 110 through the PEM 115 that conducts protons. At the negatively charged cathode 110, a reduction reaction takes place with electrons from the cathode 110 being given to protons to form hydrogen gas 130; the reaction is given by Eq. 3. The PEM 115 not only conducts protons from the anode 105 to the cathode 110, but also separates the $H_2$ gas 130 and $O_2$ gas 125 produced in the water electrolysis reaction. PEM water electrolysis is one of the favorable methods for conversion of renewable energy to high purity hydrogen with the advantage of compact system design at high differential pressures, high current density, high efficiency, fast response, small footprint, lower temperature (20-90° C.) operation, and high purity oxygen byproduct. However, one of the major challenges for PEM water electrolysis is the high capital cost of the cell stack comprising expensive acid-tolerant stack hardware such as the Pt-coated Ti bipolar plates, expensive noble metal catalysts required for the electrodes, as well as the expensive PEM.

$$\text{Water electrolysis reaction: } 2H_2O \rightarrow 2H_2 + O_2 \tag{1}$$

$$\begin{aligned}&\text{Oxidation reaction at anode for PEMWE:}\\&2H_2O \rightarrow O_2 + 4H^+ + 4e^-\end{aligned} \tag{2}$$

$$\begin{aligned}&\text{Reduction reaction at cathode for PEMWE: } 2H^+ +\\&2e^- \rightarrow H_2\end{aligned} \tag{3}$$

AEMWE is a developing technology. As shown in FIG. 2, in the AEMWE system 200, an anode 205 and a cathode 210 are separated by a solid AEM electrolyte 215. Typically, a water feed 220 with an added electrolyte such as dilute KOH or $K_2CO_3$ or a deionized water is fed to the cathode side. For some cases, the water feed 220 with an added electrolyte such as dilute KOH or $K_2CO_3$ or a deionized water is fed to the anode side or both the cathode and the anode sides. The anode and cathode catalysts typically comprise platinum metal-free Ni-based or Ni alloy catalysts. At the negatively charged cathode 210, water is reduced to form hydrogen 225 and hydroxyl ions by the addition of four electrons; the reaction is given by Eq. 4. The hydroxyl ions diffuse from the cathode 210 to the anode 205 through the AEM 215 which conducts hydroxyl ions. At the positively charged anode 205, the hydroxyl ions recombine as water and oxygen 230; the reaction is given by Eq. 5. The AEM 215 not only conducts hydroxyl ions from the cathode 210 to the anode 205, but also separates the $H_2$ 225 and $O_2$ 230 produced in the water electrolysis reaction. The AEM 215 allows the hydrogen 225 to be produced under high pressure up to about 35 bar with very high purity of at least 99.9%.

Reduction Reaction at Cathode for AEMWE:

$$4H_2O + 4e^- \rightarrow 2H_2 + 4OH^- \tag{4}$$

Oxidation Reaction at Anode for AEMWE:

$$4\ OH^- \rightarrow 2H_2O + O_2 + 4e^- \tag{5}$$

AEMWE has an advantage over PEMWE because it permits the use of less expensive platinum metal-free catalysts, such as Ni and Ni alloy catalysts. In addition, much cheaper stainless steel bipolar plates can be used in the gas diffusion layers (GDL) for AEMWE, instead of the expensive Pt-coated Ti bipolar plates currently used in PEMWE. However, the largest impediments to the development of AEM systems are membrane hydroxyl ion conductivity and stability, as well as lack of understanding of how to integrate catalysts into AEM systems. Research on AEMWE in the literature has been focused on developing electrocatalysts, AEMs, and understanding the operational mechanisms with the general objective of obtaining a high efficiency, low cost and stable AEMWE technology.

The anode in an electrochemical cell is the electrode at which the predominant reaction is oxidation (e.g., the water oxidation/oxygen evolution reaction electrode for a water electrolyzer). The cathode in an electrochemical cell is the electrode at which the predominant reaction is reduction (e.g., the proton reduction/hydrogen evolution reaction electrode for a water electrolyzer).

The membrane is one of the key materials that make up an electrolysis cell and is an important driver for safety and performance. Some important properties for membranes for electrolysis include high conductivity, high ionic permeability, high ionic exchange capacity (for ion-exchange membrane), high ionic/$H_2$ and $O_2$ selectivity (low $H_2$ and $O_2$ permeability/crossover), low price, low area resistance to minimize efficiency loss resulting from ohmic polarization, high resistance to oxidizing and reducing conditions, being chemically inert at a wide pH range, high thermal stability together with high proton conductivity, and high mechanical strength (thickness, low swelling).

Recently newer cost-effective, high performance membrane materials for use with cell stack components for water electrolysis with a wide range of applications in renewable energy systems have been invented. While presumably effective for their intended purposes, it is known that hydrogen may migrate through the thin membrane and impact the effectiveness and efficiency of the cell. The $H_2$ crossover from the cathode stream to the anode stream also leads to safety concerns if the concentration of $H_2$ in $O_2$ reaches 2%.

Accordingly, it would be desirable to provide low cost, easily manufacturable membranes that reduce or eliminate the amount of hydrogen flowing across the membrane.

DESCRIPTION

Figure 1:
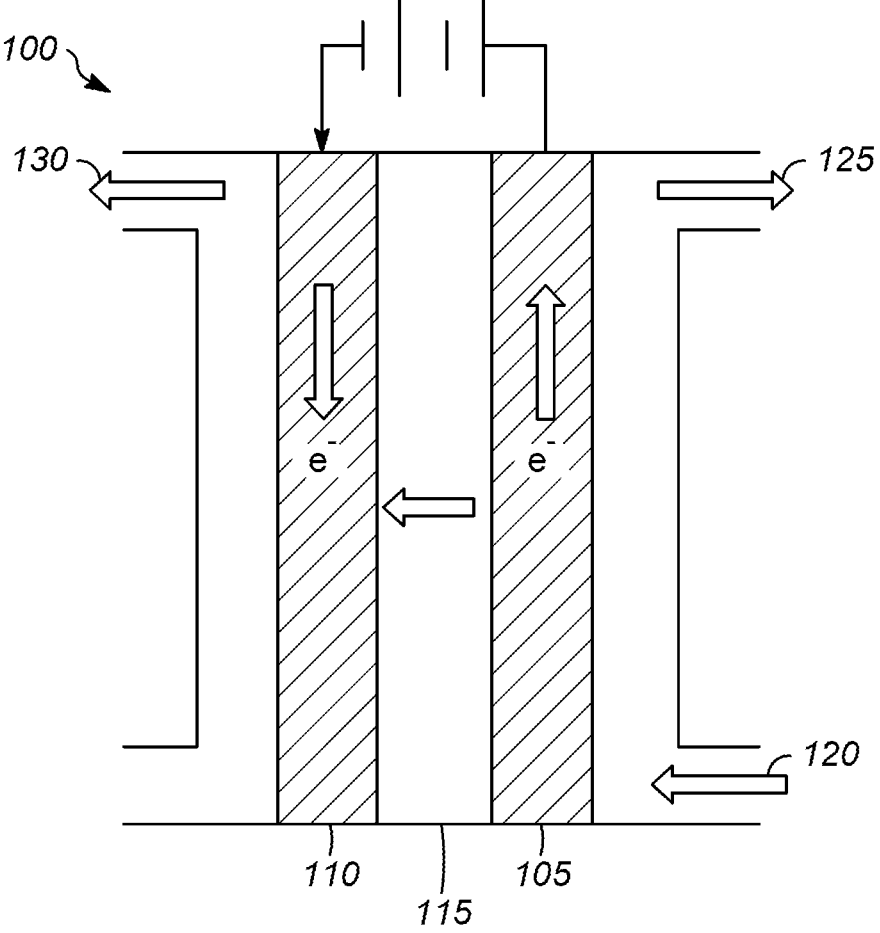
FIG. 1 is an illustration of one embodiment of a PEMWE cell.
Figure 2:
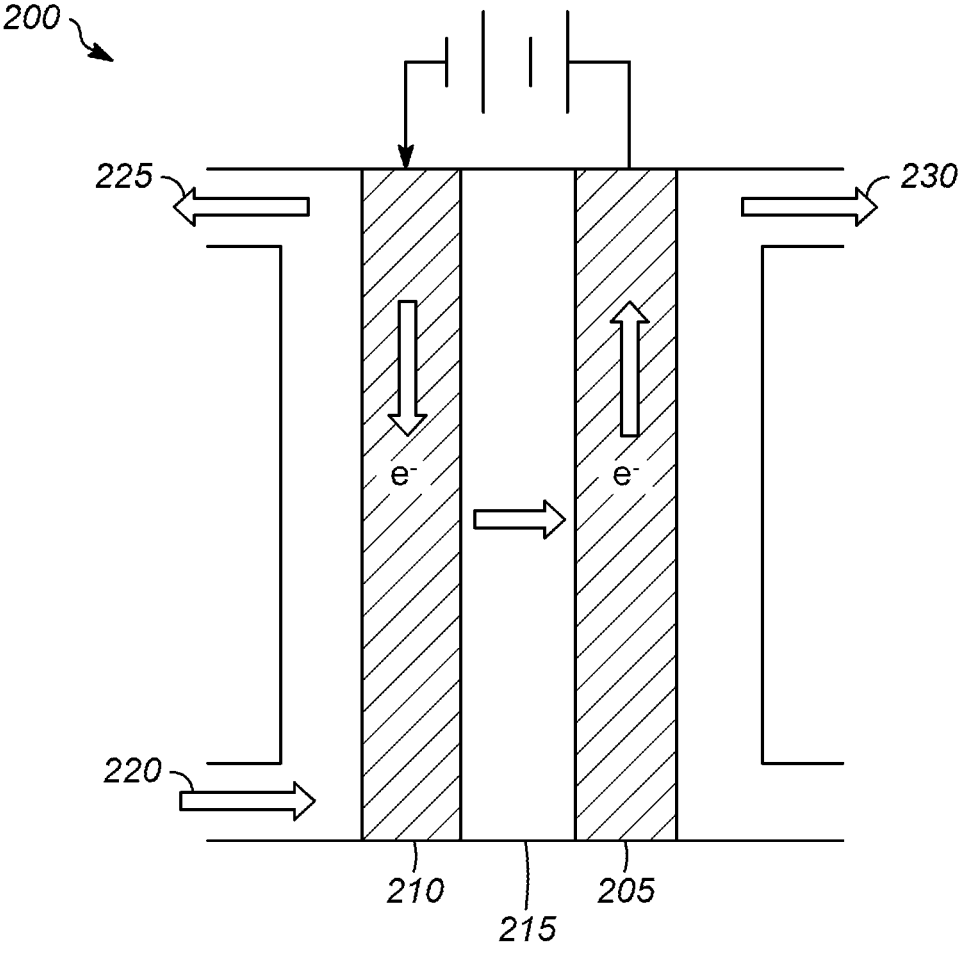
FIG. 2 is an illustration of one embodiment of a AEMWE cell.

The present invention relates to a composite proton exchange membrane and a method of making the composite proton exchange membrane. The composite proton exchange membrane can be used for the preparation of catalyst coated membrane for water electrolysis to produce green $H_2$.

The composite proton exchange membrane comprises three layers including a proton exchange membrane layer, a continuous nonporous organic-inorganic composite coating layer, and a continuous nonporous cross-linked polyelectrolyte multilayer coating. The continuous nonporous cross-linked polyelectrolyte multilayer coating is provided on the continuous nonporous organic-inorganic composite coating layer. Both the continuous nonporous crosslinked polyelectrolyte multilayer coating and the continuous nonporous organic-inorganic composite coating layer are water-insoluble. The continuous nonporous crosslinked polyelectrolyte multilayer coating significantly reduces the permeation of hydrogen from the cathode side to the anode side through the proton exchange membrane layer which leads to higher gas purity. It also addresses safety concerns compared to the proton exchange membrane without the continuous nonporous organic-inorganic composite coating layer and the continuous nonporous crosslinked polyelectrolyte multilayers. In addition, the inorganic nano-particles such as $CeO_2$ or $Ce(OH)_4$ function as radical scavengers to improve the chemical/electrochemical stability of the proton exchange membrane.

One aspect of the present invention may be broadly characterized as a composite proton exchange membrane having: a proton exchange membrane layer; a continuous nonporous organic-inorganic composite coating layer coated on a first surface of the proton exchange membrane layer; and a continuous nonporous crosslinked polyelectrolyte multilayer coating on the continuous nonporous organic-inorganic composite coating layer or on the catalyst layer.

The continuous organic-inorganic composite coating layer comprises a mixture of inorganic nanoparticles and a hydrophilic ionomer. The inorganic nanoparticles comprise $CeO_2$, $Ce(OH)_4$, $CeO_2/ZrO_2$, $Ce(OH)_4/ZrO_2$, $ZrO_2$, silica gel, precipitated silica, fumed silica, colloidal silica, or mixtures thereof. The inorganic nanoparticles have a size in a range of 1 nanometer to 500 nanometers, or 1 to 400, or 1 to 300, or 1 to 250, or 1 to 200, or 1 to 150, or 1 to 100, or 1 to 50, or 5 to 500, or 5 to 400, or 5 to 300, or 5 to 250, or 5 to 200, or 5 to 150, or 5 to 100, or 5 to 50, or 10 to 500, or 11 to 400, or 10 to 300, or 10 to 250, or 10 to 200, or 10 to 150, or 10 to 100, or 10 to 50.

The weight ratio of the inorganic nanoparticles to the hydrophilic ionomer in the continuous nonporous organic-inorganic composite coating layer is in a range of 1/300 to 7/10, or 1/300 to 1/2, or 1/300 to 1/10.

The continuous nonporous organic-inorganic composite coating layer typically has a thickness in the range of 1 micrometer to 20 micrometers, or 1 to 15, or 5 to 20, or 5 to 15, or 10 to 15.

145 The hydrophilic ionomeric polymer in the continuous nonporous organic-inorganic composite coating layer comprises a hydrophilic ionomeric polymer or a cross-linked hydrophilic ionomeric polymer comprising repeat units of both electrically neutral repeating units and a fraction of ionized functional groups such as $-SO_3^-$, $-COO^-$, $-PO_3^{2-}$, $-PO_3H^-$, $-C_6H_4O^-$, $-O_4B^-$, $-NH_3^+$, $-NRH_2^+$, $-NR_2H^+$, $-NR_3^+$, or $-SR_2^-$. The 150 hydrophilic ionomeric polymer contains high water affinity polar or charged functional groups such as $-SO_3^-$, $-COO^-$ or $-NH_3^+$ group.

Suitable hydrophilic ionomeric polymers include, but are not limited to, a perfluorinated ionomer such as Nafion®, Aciplex®, or Aquivion®, a cross-linked perfluorinated cation-exchange polymer, a partially fluorinated polymer, a cross-linked partially fluorinated proton-exchange polymer, a non-fluorinated hydrocarbon polymer, a cross-linked non-fluorinated hydrocarbon proton-exchange polymer, or combinations thereof.

The proton exchange membrane layer typically has a thickness in a range of 10 to 50 micrometers, or 10 to 45, or 10 to 40, or 10 to 35, or 10 to 30.

Suitable proton exchange polymers include, but are not limited to, a perfluorinated sulfonic acid-based polymer, a perfluorinated carboxylic acid polymer, a sulfonated aromatic hydrocarbon polymer, a cross-linked sulfonated aromatic hydrocarbon polymer, or combinations thereof. Suitable cation exchange polymers include, but are not limited to, a copolymer of tetrafluoroethylene and perfluoro-3,6-dioxa-4-methyl-7-octene-sulfonic acid, a copolymer of tetrafluoroethylene and perfluoro-5-oxa-6-heptene-sulfonic acid, a copolymer of tetrafluoroethylene and perfluoro-4-oxa-5-hexene-sulfonic acid, a copolymer of tetrafluoroethylene and perfluoro-3-oxa-4-pentene-sulfonic acid, a copolymer of perfluoro-3,6-dioxa-4-methyl-7-octene-sulfonic acid and perfluoro(2,2-dimethyl-1,3-dioxole), a copolymer of perfluoro-5-oxa-6-heptene-sulfonic acid and perfluoro(2,2-dimethyl-1,3-dioxole), a copolymer of perfluoro-4-oxa-5-hexene-sulfonic acid and perfluoro(2,2-dimethyl-1,3-dioxole), a copolymer of perfluoro-3-oxa-4-pentene-sulfonic acid and perfluoro(2,2-dimethyl-1,3-dioxole), a copolymer of perfluoro-3,6-dioxa-4-methyl-7-octene-sulfonic acid and perfluoro(2-methylene-4-methyl-1,3-dioxolane), a copolymer of perfluoro-5-oxa-6-heptene-sulfonic acid and perfluoro(2-methylene-4-methyl-1,3-dioxolane), a copolymer of perfluoro-4-oxa-5-hexene-sulfonic acid and perfluoro(2-methylene-4-methyl-1,3-dioxolane), a copolymer of perfluoro-3-oxa-4-pentene-sulfonic acid and perfluoro(2-methylene-4-methyl-1,3-dioxolane), a copolymer of perfluoro-3,6-dioxa-4-methyl-7-octene-sulfonic acid and 2,2,4-trifluoro-5-trifluoromethoxy-1,3-dioxole, a copolymer of perfluoro-5-oxa-6-heptene-sulfonic acid and 2,2,4-trifluoro-5-trifluoromethoxy-1,3-dioxole, a copolymer of perfluoro-4-oxa-5-hexene-sulfonic acid and 2,2,4-trifluoro-5-trifluoromethoxy-1,3-dioxole, a copolymer of perfluoro-3-oxa-4-pentene-sulfonic acid and 2,2,4-trifluoro-5-trifluoromethoxy-1,3-dioxole, sulfonated poly(ether ether ketone) (SPEEK), sulfonated polyether sulfone, sulfonated polyphenyl sulfone, sulfonated poly(2,6-dimethyl-1,4-phenylene oxide), sulfonated poly(4-phenoxybenzoyl-1,4-phenylene), sulfonated polyphenylene oxide, sulfonated poly(phenylene), sulfonated poly(phthalazinone), cross-linked SPEEK, cross-linked sulfonated polyether sulfone, cross-linked sulfonated polyphenyl sulfone, crosslinked poly(phenylene sulfide sulfone nitrile), sulfonated polystyrene, sulfonated poly(vinyl toluene), cross-linked sulfonated polystyrene, cross-linked sulfonated poly(vinyl toluene), or combinations thereof.

The proton exchange membrane layer comprises a cation exchange polymer or a mixture of a cation exchange polymer and an inorganic filler comprising covalently bonded acidic functional groups. The proton exchange membrane may comprise $-SO_3^-$, $-COO^-$, $-PO_3^{2-}$, or $-PO_3H^-$ cation exchange functional groups with negative ionic charges. The proton exchange polymer in the proton exchange membrane may be selected from, but is not limited to, a perfluorinated ionomer such as Nafion®, Aciplex®, or Aquivion® a cross-linked perfluorinated cation-exchange polymer, a partially fluorinated polymer, a cross-linked partially fluorinated proton-exchange polymer, a non-fluorinated hydrocarbon polymer, a cross-linked non-fluorinated hydrocarbon proton-exchange polymer, or combinations thereof. The proton exchange membrane layer has high mechanical strength, good chemical and thermal stability, and good proton conductivity.

The proton exchange membrane may be the composite proton conductive membrane described in U.S. patent application Ser. No. 17/162,421, filed on Jan. 29, 2021, entitled Composite Proton Conductive Membranes, which is incorporated herein by reference in its entirety. That application disclosed a new type of composite proton conductive membrane comprising an inorganic filler having covalently bonded acidic functional groups and a high surface area of at least 150 m²/g, and a water insoluble ionically conductive polymer. The deposition of the polyelectrolyte multilayer coating on the composite proton conductive membrane resulted in reduced membrane swelling, significantly reduced $H_2$ and $O_2$ crossover, and enhanced proton conductivity compared to the composite proton conductive membrane without the polyelectrolyte multilayer coating.

The inorganic filler comprising covalently bonded acidic functional groups in the proton exchange membrane may be selected from, but is not limited to, silica gel, precipitated silica, fumed silica, colloidal silica, alumina, silica-alumina, zirconium oxide, molecular sieve, metal-organic framework, zeolitic imidazolate framework, covalent organic framework, or a combination thereof, and wherein the filler may comprise both covalently bonded acidic functional groups and a high surface area of 150 m²/g or higher, or 300 m²/g or higher, or 400 m²/g or higher. Molecular sieves have framework structures which may be characterized by distinctive wide-angle X-ray diffraction patterns. Zeolites are a subclass of molecular sieves based on an aluminosilicate composition. Non-zeolitic molecular sieves are based on other compositions such as aluminophosphates, silico-aluminophosphates, and silica. Molecular sieves can have different chemical compositions and different framework structure. The molecular sieves can be microporous or mesoporous molecular sieves and need to be stable in aqueous solution under pH of less than 6. The acidic functional groups covalently bonded to the inorganic fillers may be selected from, but are not limited to, $-H_2PO_3$, $-R-H_2PO_3$, $-SO_3H$, $-R-SO_3H$, $-COOH$, $-R-COOH$, $-C_6H_5OH$, $-R-C_6H_5OH$, or a combination thereof, wherein R represents a linear alkyl group, a branched alkyl group, a cycloalkyl group, an organoamino group, an acid group-substituted organoamino group, or an aryl group and the number of carbon atoms in these groups is preferably 1 to 20, more preferably 1 to 10. The inorganic fillers may be in the form of, but are not limited to, particles, fine beads, thin plates, rods, or fibers. The size of the inorganic filler is in a range of about 2 nm to about 200 μm, or in a range of about 10 nm to about 100 μm, or in a range of about 50 nm to about 80 μm. In some embodiments, the inorganic filler is aminopropyl-N,N-bis(methyl phosphonic acid)-functionalized silica gel such as SilicaMetS® AMPA, aminopropyl-N,N-bis(methyl phosphonic acid)-functionalized fumed silica, n-propyl phosphonic acid-functionalized silica gel, n-propyl phosphonic acid-functionalized fumed silica, p-toluenesulfonic acid-functionalized silica gel, p-toluenesulfonic acid-functionalized fumed silica, 4-ethylbenzenesulfonic acid-functionalized silica gel such as SilicaBond® Tosic Acid, 4-ethylbenzenesulfonic acid-functionalized fumed silica, n-propyl sulfonic acid-functionalized silica gel, n-propyl sulfonic acid-functionalized fumed silica, or combinations thereof.

The polyelectrolyte multilayer coating comprises alternating layers of a polycation polymer and a polyanion polymer. The polycation polymer layer is deposited on and is in contact with the organic-inorganic composite coating layer. There can be one, two, three, four, five, or more sets of alternating polycation polymer and polyanion polymer layers on the surface of the cation exchange membrane. The top layer of the polyelectrolyte multilayer coating can be either a polycation polymer layer or a polyanion polymer layer.

The polyelectrolyte multilayer coating typically has a thickness less than the thickness of the proton exchange membrane. The thickness of the polyelectrolyte multilayer coating is typically in a range of 1 nanometer to 200 nanometers, or 1 to 150, or 1 to 100, or 1 to 50, or 1 to 20, or 2 to 200, or 2 to 150, or 2 to 100, or 2 to 50, or 2 to 20, or 5 to 200, or 5 to 150, or 5 to 100, or 5 to 50, or 5 to 20.

There can be a second polyelectrolyte multilayer coating on the second surface of the proton exchange membrane.

The polyelectrolyte multilayer coating may be formed using a layer-by-layer self-assembly method. The layer-by-layer self-assembly may be achieved by adsorption, electrostatic interactions, covalent bonds, hydrogen bonds, van der Waals forces, hydrophobic interactions, or combinations thereof, for example. The methods for the formation of polyelectrolyte multilayer coating via layer-by-layer self-assembly may be selected from, but are not limited to, dip coating, spray deposition, centrifugal deposition, electrodeposition, meniscus/slot die coating, brushing, roller coating, metering rod/Meyer bar coating, knife casting, and the like.

The choice of the fabrication method depends on the polycation and polyanion to be assembled, the time required for the layer-by-layer self-assembly, and the shape of the cation exchange membrane that the polyelectrolyte multilayer coating will be deposited on. The first polyelectrolyte layer is formed by the adsorption (for example) of a polycation or polyanion on the surface of the organic-inorganic composite coating layer. Subsequently, the second layer of the polyelectrolyte with charges opposite from the first layer of the polyelectrolyte is deposited on the first layer of the polyelectrolyte to form one set of alternating layers on the organic-inorganic composite coating layer. The increase in polyelectrolyte multilayer thickness depends on the number of layers deposited and can be either linear or non-linear. Several parameters, such as ionic strength, pH, temperature, polyelectrolyte structure, concentration, and charge density, can be adjusted during the layer-by-layer self-assembly process. The oppositely changed polyelectrolyte layers are deposited on the surface of the organic-inorganic composite coating layer. The polyelectrolyte multilayers have ionically cross-linked structure and are insoluble in water and thermally and chemically stable.

The first layer deposited on the surface of the continuous nonporous organic-inorganic composite coating layer (and the second surface of the proton exchange membrane possessing negative ionic charges if present) should be a polycation polymer layer having positive ionic charges, opposite from those on the continuous nonporous organic-inorganic composite coating layer (and the proton exchange membrane layer), which leads to the formation of a stable coating as the first part of the first polyelectrolyte bilayer via electrostatic interactions between the cation exchange polymer on the surface of the continuous nonporous organic-inorganic composite coating layer and the polycation deposited on the surface of the continuous nonporous organic-inorganic composite coating layer. A polyanion polymer with opposite charges is then deposited on the surface of the first polycation polymer coating layer via electrostatic interactions to form the second part of the first polyelectrolyte bilayer. Polyelectrolyte multilayers of (polycation-polyanion) n can be formed following the same alternating deposition process. The thickness of each layer of the polyanion or polycation is less than 50 nm, or less than 20 nm, or less than 10 nm, or less than 5 nm. The polyanion polymer in the polyelectrolyte multilayers has negative charges and can be the same or different from the cation exchange polymer in the continuous nonporous organic-inorganic composite coating layer and the proton exchange membrane layer, but the polyanion polymer cannot be the first polyelectrolyte layer deposited on the surface of the continuous nonporous organic-inorganic composite coating layer having negative charges. The polyanion polymer suitable for the preparation of the polyelectrolyte multilayer has similar or higher proton conductivity than the proton exchange membrane and has similar or lower $H_2$ and $O_2$ permeabilities than the proton exchange membrane. However, the polyanion polymer and the polycation polymer may be soluble in aqueous solutions, which makes the membranes prepared from either the polyanion polymer or polyanion polymer unsuitable for water electrolysis or fuel cell applications. Therefore, it is important to form polyelectrolyte multilayers comprising ionically cross-linked alternating polycations and polyanions. The polyelectrolyte multilayers formed via layer-by-layer self-assembly are not only insoluble in water and thermally and chemically stable, but also have significantly reduced swelling and $H_2$ and $O_2$ crossover, and enhanced proton conductivity compared to the proton exchange membrane layer for water electrolysis or fuel cell applications.

The polycation polymers suitable for the preparation of the polyelectrolyte multilayer coating include, but are not limited to protonated chitosan; an amine based linear, hyperbranched, or dendritic polycation polymer selected from the group consisting of polybiguanide, quaternary ammonium polyethylenimine, quaternary ammonium polypropylenimine, quaternary ammonium polyamidoamine (PAMAM), poly(vinylamine hydrochloride) (PVH), poly(allylamine hydrochloride) (PAH), poly(amidoamine hydrochloride), poly(N-isopropylallylamine hydrochloride), poly(N-tert-butylallylamine hydrochloride), poly(N-1,2-dimethylpropylallylamine hydrochloride), poly(N-methylallylamine hydrochloride), poly(N,N-dimethylallylamine hydrochloride), poly(2-vinylpiperidine hydrochloride), poly(4-vinylpiperidine hydrochloride), poly(4-vinylpyridine hydrochloride), poly(diallyldimethylammonium chloride), poly(acrylamide-co-diallyldimethylammonium chloride), poly(diallyl methyl amine hydrochloride), a copolymer of 2-propen-1-amine-hydrochloride with N-2-propenyl-2-propen-1-aminehydrochloride, poly(N-alkyl-4-vinylpyridinium) salt, polylysine, polyornithine, polyarginine, poly (ethylene oxide)-block-poly(vinyl benzyl trimethylammonium chloride), poly(ethylene oxide)-block-poly(l-lysine), poly(2-methacryloyloxyethyl phosphorylcholine methacrylate)-block-poly(vinyl benzyl trimethylammonium chloride), poly[2-(dimethylamino)-ethyl methacrylate, poly[3-(dimethylamino)-propyl methacrylate], poly[2-(dimethylamino)-ethyl methacrylamide], poly [3-(dimethylamino) propyl methacrylamide], poly[2-(trimethylamino)ethyl methacrylate chloride], poly[2-(diethylamino)ethyl methacrylate], poly[2-(dimethylamino) ethyl acrylate], or combinations thereof.

The polyanion polymers suitable for the preparation of the polyelectrolyte multilayer coating include but, are not limited to, a sulfonated hydrocarbon polymer, poly(acrylic acid), poly(sodium phosphate), or a negatively charged polysaccharide polyanion polymer, or combinations thereof. Suitable sulfonated hydrocarbon polymers include, but are not limited to, sulfonated poly(ether ether ketone), sulfonated polyether sulfone, sulfonated polyphenyl sulfone, sulfonated poly(2,6-dimethyl-1,4-phenylene oxide), sulfonated poly(4-phenoxybenzoyl-1,4-phenylene), sulfonated polyphenylene oxide, sulfonated poly(phenylene), sulfonated poly(phthalazinone), sulfonated polystyrene, sulfonated poly(vinyl toluene), poly(acrylic acid), poly (vinylsulfonic acid sodium), poly(sodium phosphate), or combinations thereof. Suitable negatively charged polysaccharide polyanion polymers include, but are not limited to, sodium alginate, potassium alginate, calcium alginate, ammonium alginate, alginic acid, sodium hyaluronate, potassium hyaluronate, calcium hyaluronate, ammonium hyaluronate, hyaluronic acid, κ-carrageenan, λ-carrageenan, ι-carrageenan, carboxymethyl curdlan, sodium carboxymethyl curdlan, potassium carboxymethyl curdlan, calcium carboxymethyl curdlan, ammonium carboxymethyl curdlan, carboxymethyl cellulose, sodium carboxymethyl cellulose, potassium carboxymethyl cellulose, calcium carboxymethyl cellulose, ammonium carboxymethyl cellulose, or combinations thereof.

Another aspect of the present invention may be broadly characterized as a composite proton exchange membrane comprising: a proton exchange membrane layer having a first surface and a second surface; a continuous nonporous organic-inorganic composite coating layer having a first surface and a second surface, the first surface of the continuous nonporous organic-inorganic composite coating layer on the first surface of the proton exchange membrane, the continuous nonporous organic-inorganic composite coating layer comprising a mixture of inorganic nanoparticles and a hydrophilic ionomer; and a continuous nonporous cross-linked polyelectrolyte multilayer coating on the second surface of the organic-inorganic composite coating layer, the polyelectrolyte multilayer coating comprising alternating layers of a polycation polymer and a polyanion polymer, and wherein the polycation polymer layer is in contact with the organic-inorganic composite coating layer; an anode on a second surface of the continuous nonporous cross-linked polyelectrolyte multilayer coating; and a cathode on the second surface of the proton exchange membrane layer; or a cathode on a second surface of a second continuous nonporous cross-linked polyelectrolyte multilayer coating on the second surface of the proton exchange membrane layer Any suitable anode and cathode materials can be used. Suitable anodes include, but are not limited to, iridium, platinum, ruthenium, osmium, rhodium, palladium, tin, tungsten, vanadium, cobalt, silver, gold, copper, nickel, molybdenum, iron, chromium, alloys thereof, oxides thereof, carbides thereof, phosphides thereof, or combinations thereof. Suitable cathodes include, but are not limited to, platinum, ruthenium, osmium, rhodium, palladium, tin, tungsten, vanadium, cobalt, silver, gold, nickel, molybdenum, iron, copper, chromium, alloys thereof, oxides thereof, carbides thereof, phosphides thereof, or combinations thereof.

Another aspect of the present invention may be characterized broadly as providing a method for preparing a composite proton exchange membrane comprising applying a continuous nonporous organic-inorganic composite coating layer directly on a first surface of a proton exchange membrane, the continuous nonporous organic-inorganic composite coating layer comprising a mixture of inorganic nanoparticles and a hydrophilic ionomer; and applying a continuous nonporous cross-linked polyelectrolyte multilayer coating directly on a surface of the continuous nonporous organic-inorganic composite coating layer, the polyelectrolyte multilayer coating comprising alternating layers of a polycation polymer and a polyanion polymer, wherein the polycation polymer layer is in contact with the continuous nonporous organic-inorganic composite coating layer.

The method may include applying a second continuous cross-linked polyelectrolyte multilayer coating directly on a second surface of the proton exchange membrane, the polyelectrolyte multilayer coating comprising alternating layers of a polycation polymer and a polyanion polymer, wherein the polycation polymer layer is in contact with the proton exchange membrane.

The method may also include applying an anode on a second surface of the continuous nonporous cross-linked polyelectrolyte multilayer coating, and applying a cathode to a second surface of the proton exchange membrane; or applying an anode on a second surface of the continuous nonporous cross-linked polyelectrolyte multilayer coating, applying a second continuous nonporous cross-linked polyelectrolyte multilayer coating on a second surface of the proton exchange membrane, and applying a cathode to a second surface of the second continuous nonporous cross-linked polyelectrolyte multilayer coating.

The process has a number of advantages. The process simplifies the multilayer proton exchange membrane manufacturing process and reduces the number of fabrication steps. This results in a reduction in the membrane fabrication cost and improved membrane production rate.

Figure 3:
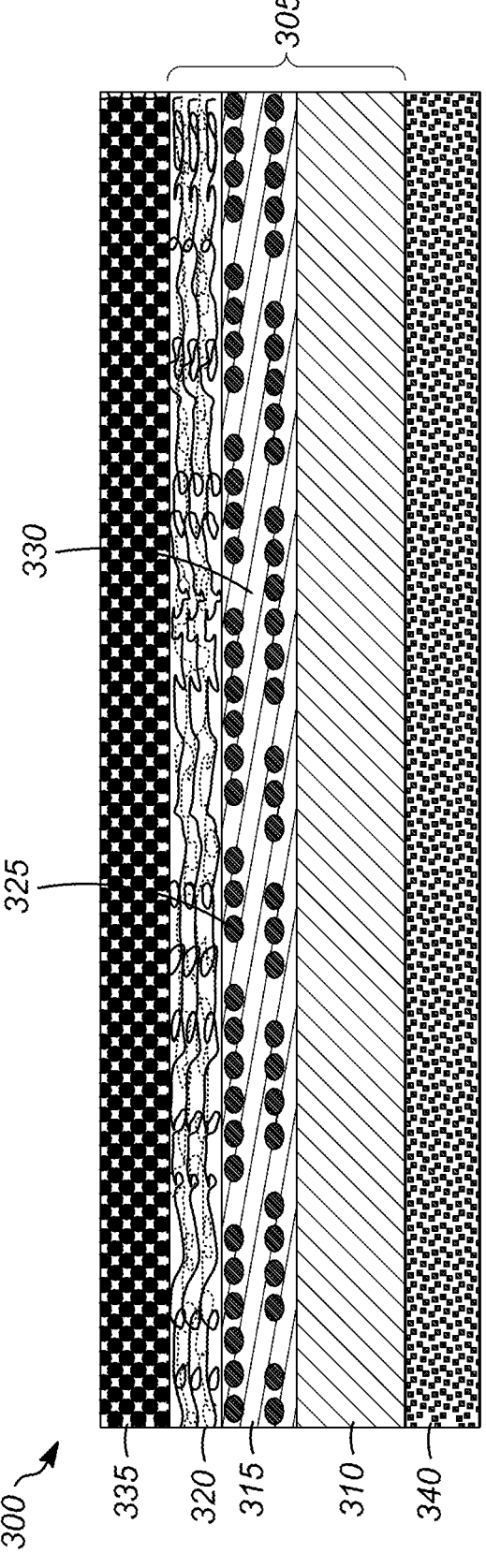
FIG. 3 is an illustration of one embodiment of a composite proton exchange membrane of the present invention for PEMWE application.

FIG. 3 illustrates one embodiment of catalyst coated membrane 300 incorporating the composite proton exchange membrane 305. The composite proton exchange membrane 305 includes the proton exchange membrane layer 310, the continuous nonporous organic-inorganic composite coating layer 315 and the continuous nonporous cross-linked polyelectrolyte multilayer coating 320. The organic-inorganic composite coating layer 315 comprises a mixture of inorganic nanoparticles 325 and a hydrophilic ionomer. There is an anode 335 next to the polyelectrolyte multilayer coating 320 and a cathode 340 next to the proton exchange membrane layer 310. There could be a second polyelectrolyte multilayer coating between the proton exchange membrane layer 310 and the cathode 340.

EXAMPLES

Example 1: Fabrication of a Composite Proton Exchange Membrane (Abbreviated as CPEM)

A mixture containing nanosized $CeO_2$, Nafion® ionomer suspension, water, and EtOH was sonicated by a probe in an ice bath to form a uniform dispersion. A thin layer of the dispersion was applied to one surface of the Nafion® 212 base membrane using a Mayer rod coating method. The coated membrane was dried for 30 min at 60° C. in an oven to evaporate all the solvents and solidify the coating layer. Afterwards, membrane was annealed for 1 h at 100° C. to form a $CeO_2$/Nafion® coated Nafion® membrane. A poly (allylamine hydrochloride) (PAH) polycation solution was prepared by dissolving NaCl and PAH in deionized (DI) $H_2O$ and adjusting the pH to 2.3. A sulfonated poly(ether ether ketone) (SPEEK) polyanion aqueous solution was prepared by dissolving NaCl and SPEEK in DI $H_2O$ at 80° C. and the pH was adjusted to 5.8. The surface of the $CeO_2$/Nafion® composite coating layer on the $CeO_2$/Nafion® coated Nafion® membrane was immersed in the PAH polycation solution for 5 min, and the membrane was rinsed with DI $H_2O$ 3 times. The membrane was then immersed in the SPEEK polyanion solution for 5 min. The membrane was rinsed with DI $H_2O$ 3 times and one ionically cross-linked PAH/SPEEK polyelectrolyte bilayer was deposited on the surface of the $CeO_2$/Nafion® composite coating layer. This process was repeated to deposit three PAH/SPEEK polyelectrolyte bilayers on the surface of the $CeO_2$/Nafion® composite coating layer. The coated membrane was dried for 30 min at 60° C. to form CPEM membrane.

Example 2: Fabrication of a Catalyst-Coated Composite Proton Exchange Membrane Using CPEM (Abbreviated as CPEM-CCM)

An anode ink comprising an $IrO_2$ oxygen evolution reaction (OER) catalyst, water, a solution of poly(3,4-ethylenedioxythiophene) (PEDOT), EtOH, a Nafion® ionomer suspension, and glycerol was coated on the surface of the PAH/SPEEK polyelectrolyte bilayers of the CPEM membrane prepared in Example 1 using a Mayer rod coating method. After the anode coating, the anode catalyst-coated membrane was dried for 30 min at 60° C. The anode $IrO_2$ loading was about 1.0 mg/cm². Then, a cathode ink comprising Pt/C catalyst, water, a PEDOT solution, EtOH, a Nafion® ionomer suspension, and glycerol was coated on a second surface of the CPEM membrane using the Mayer rod coating method to form a three-layer catalyst-coated membrane CPEM-CCM. The CPEM-CCM was dried for 30 min at 60° C. and then for another 2 h at 100° C. The cathode Pt loading was about 0.2 mg/cm². The CPEM-CCM was soaked in 0.1M $H_2SO_4$ for 24 hours at room temperature, rinsed with ultra-pure water, and finally air dried for 16 h at room temperature.

Comparative Example 1: Fabrication of a Catalyst-Coated Proton Exchange Membrane Using Nafion® 115 Membrane (Abbreviated as N115-CCM)

An anode ink comprising an $IrO_2$ catalyst, water, a solution of poly(3,4-ethylenedioxythiophene) (PEDOT), EtOH, and Nafion® ionomer suspension was spray coated on one surface of Nafion® 115 membrane at 80° C. The anode $IrO_2$ loading was about 1.0 mg/cm². Then, a cathode ink comprising Pt/C catalyst, water, a PEDOT solution, EtOH, and a Nafion® ionomer suspension was spray coated on the second surface of the Nafion® 115 membrane at 80° C. to form a three-layer catalyst-coated membrane N115-CCM. The cathode Pt loading was about 0.2 mg/cm². The N115-CCM was soaked in 0.1M $H_2SO_4$ for 24 hours at room temperature, rinsed with ultra-pure water, and finally air dried for 16 h at room temperature.

Example 3: In-Plane Conductivity Evaluation of CPEM Membrane

The CPEM membrane prepared in Example 1 was cut into a strip with 1 cm width and put in a glass bottle. It was soaked in a 1M HCl solution for 16 h at 80° C. Then the membrane was soaked in ultra-pure water to remove HCl from the membrane. The membrane was rinsed with ultra-pure water three times and then installed in a testing cell with three Pt electrodes and soaked in fresh ultra-pure water at room temperature. The testing cell was connected to a potentiostat (Gamry Reference 600+), an impedance analyzer for electrochemical impedance spectroscopy (EIS). A galvanostatic EIS measurement in the range from 100 kHz to 10 Hz with a 10 points/decade rate was conducted. The resistance was extracted from the Nyquist plot and the in-plane conductivity was calculated. The in-plane conductivity of the CPEM obtained from this measurement is 122.9 mS/cm.

Figure 4:
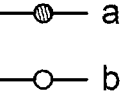
FIG. 4 is a graph of polarization curves of a water electrolysis cell comprising of (a) CPEM-CCM and (b) N115-CCM at 80° C., atmospheric pressure.
Figure 4:
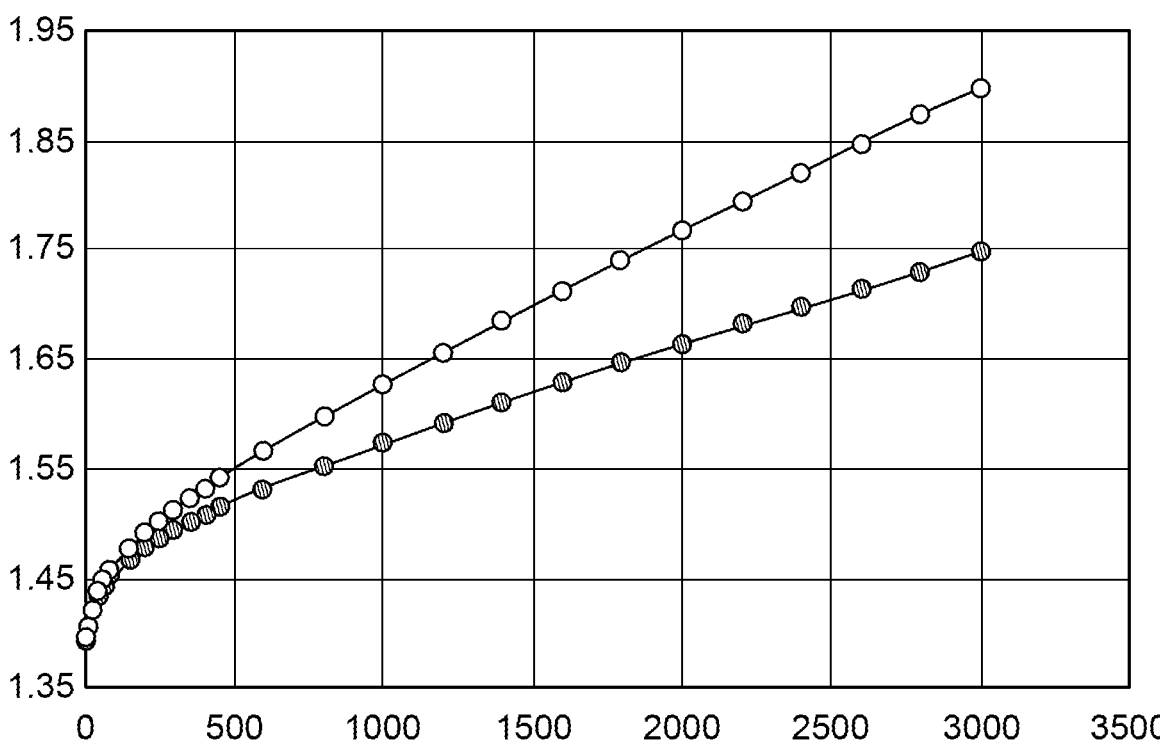

Example 4: Water Electrolysis Performance Evaluation of CPEM-CCM and N115-CCM The water electrolysis performance of N115-CCM prepared in Comparative Example 1 and CPEM-CCM prepared in Example 2 were evaluated using a single water electrolysis cell at atmospheric pressure in a Scribner unit. The CCM was sandwiched between a carbon paper and a Pt-coated titanium porous transport layers (PTL) to form the catalyst-coated membrane electrode assembly. Then, the catalyst-coated membrane electrode assembly was installed in a Scribner test cell with an active catalyst coating area of 5 $cm^2$. A water electrolysis test station (Scribner 600 electrolyzer test system) was used to evaluate the water electrolysis performance of N115-CCM and CPEM-CCM. PTLs and compression factors, defined as ratio between sealing gasket thickness and PTL thickness, were identical between these assemblies. The test station included an integrated power supply, a potentiostat for EIS and high-frequency resistance (HFR). The testing was conducted at 80° C. under 15 psig pressure with an ultra-pure water feed at the anode side of the test cell with a flow rate of 100 mL/min. The polarization curves are shown in FIG. 4. The $H_2$ concentration in $O_2$ in the anode gas stream was measured by gas chromatography (GC). It can be observed from the polarization curves in FIG. 4 that the CPEM-CCM showed much higher current density than the N115-CCM at 1.7 V cell voltage, demonstrating that the water electrolyzer comprising CPEM-CCM has higher hydrogen production rate than that comprising N115-CCM. In addition, the CPEM-CCM showed lower $H_2$ crossover than N115-CCM. A low $H_2$ concentration in $O_2$ of 0.41% in the anode gas stream at 2 A/$cm^2$ current density was obtained for CPEM-CCM compared to a $H_2$ concentration in $O_2$ of 0.71% in the anode gas stream at 2 A/$cm^2$ current density for N115-CCM.

SPECIFIC EMBODIMENTS

While the following is described in conjunction with specific embodiments, it will be understood that this description is intended to illustrate and not limit the scope of the preceding description and the appended claims.

A first embodiment of the invention is a proton exchange membrane layer comprising a proton exchange membrane layer having a first surface and a second surface; a continuous nonporous organic-inorganic composite coating layer having a first surface and a second surface, the first surface of the continuous organic-inorganic composite coating layer on the first surface of the proton exchange membrane, the continuous organic-inorganic composite coating layer comprising a mixture of inorganic nanoparticles and a hydrophilic ionomer; and a continuous nonporous cross-linked polyelectrolyte multilayer coating on the second surface of the organic-inorganic composite coating layer, the polyelectrolyte multilayer coating comprising alternating layers of a polycation polymer and a polyanion polymer, and wherein the polycation polymer layer is in contact with the organic-inorganic composite coating layer. An embodiment of the invention is one, any or all of prior embodiments in this paragraph up through the first embodiment in this paragraph wherein the inorganic nanoparticles comprise $CeO_2$, $Ce(OH)_4$, $CeO_2/ZrO_2$, $Ce(OH)_4/ZrO_2$, $ZrO_2$, silica gel, precipitated silica, fumed silica, colloidal silica, or mixtures thereof. An embodiment of the invention is one, any or all of prior embodiments in this paragraph up through the first embodiment in this paragraph wherein the inorganic nanoparticles have a size in a range of about 1 nanometer to about 500 nanometers. An embodiment of the invention is one, any or all of prior embodiments in this paragraph up through the first embodiment in this paragraph wherein the proton exchange membrane layer thickness is in a range of about 10 micrometers to about 50 micrometers. An embodiment of the invention is one, any or all of prior embodiments in this paragraph up through the first embodiment in this paragraph wherein a weight ratio of the inorganic nanoparticles to the hydrophilic ionomer in the continuous organic-inorganic composite coating layer is in a range of 1/300 to 7/10. An embodiment of the invention is one, any or all of prior embodiments in this paragraph up through the first embodiment in this paragraph wherein the proton exchange membrane layer comprises a cation exchange polymer or a mixture of a cation exchange polymer and an inorganic filler comprising covalently bonded acidic functional groups. An embodiment of the invention is one, any or all of prior embodiments in this paragraph up through the first embodiment in this paragraph wherein the cation exchange polymer comprises a perfluorinated sulfonic acid-based polymer, a perfluorinated carboxylic acid polymer, a sulfonated aromatic hydrocarbon polymer, a cross-linked sulfonated aromatic hydrocarbon polymer, or combinations thereof. An embodiment of the invention is one, any or all of prior embodiments in this paragraph up through the first embodiment in this paragraph wherein the ionomer comprises a proton-conductive fluorinated or non-fluorinated polymeric ionomer. An embodiment of the invention is one, any or all of prior embodiments in this paragraph up through the first embodiment in this paragraph wherein the proton-conductive fluorinated or non-fluorinated polymeric ionomer comprises a copolymer of tetrafluoroethylene and perfluoro-3,6-dioxa-4-methyl-7-octene-sulfonic acid, a copolymer of tetrafluoroethylene and perfluoro-5-oxa-6-heptene-sulfonic acid, a copolymer of tetrafluoroethylene and perfluoro-4-oxa-5-hexene-sulfonic acid, a copolymer of tetrafluoroethylene and perfluoro-3-oxa-4-pentene-sulfonic acid, a copolymer of perfluoro-3,6-dioxa-4-methyl-7-octene-sulfonic acid and perfluoro(2,2-dimethyl-1,3-dioxole), a copolymer of perfluoro-5-oxa-6-heptene-sulfonic acid and perfluoro(2,2-dimethyl-1,3-dioxole), a copolymer of perfluoro-4-oxa-5-hexene-sulfonic acid and perfluoro(2,2-dimethyl-1,3-dioxole), a copolymer of perfluoro-3-oxa-4-pentene-sulfonic acid and perfluoro(2,2-dimethyl-1,3-dioxole), a copolymer of perfluoro-3,6-dioxa-4-methyl-7-octene-sulfonic acid and perfluoro(2-methylene-4-methyl-1,3-dioxolane), a copolymer of perfluoro-5-oxa-6-heptene-sulfonic acid and perfluoro(2-methylene-4-methyl-1,3-dioxolane), a copolymer of perfluoro-4-oxa-5-hexene-sulfonic acid and perfluoro(2-methylene-4-methyl-1,3-dioxolane), a copolymer of perfluoro-3-oxa-4-pentene-sulfonic acid and perfluoro(2-methylene-4-methyl-1,3-dioxolane), a copolymer of perfluoro-3,6-dioxa-4-methyl-7-octene-sulfonic acid and 2,2,4-trifluoro-5-trifluoromethoxy-1,3-dioxole, a copolymer of perfluoro-5-oxa-6-heptene-sulfonic acid and 2,2,4-trifluoro-5-trifluoromethoxy-1,3-dioxole, a copolymer of perfluoro-4-oxa-5-hexene-sulfonic acid and 2,2,4-trifluoro-5-trifluoromethoxy-1,3-dioxole, a copolymer of perfluoro-3-oxa-4-pentene-sulfonic acid and 2,2,4-trifluoro-5-trifluoromethoxy-1,3-dioxole, sulfonated poly(ether ether ketone) (SPEEK), sulfonated polyether sulfone, sulfonated polyphenyl sulfone, sulfonated poly(2,6-dimethyl-1,4-phenylene oxide), sulfonated poly(4-phenoxybenzoyl-1,4-phenylene), sulfonated polyphenylene oxide, sulfonated poly (phenylene), sulfonated poly(phthalazinone), cross-linked SPEEK, cross-linked sulfonated polyether sulfone, cross-linked sulfonated polyphenyl sulfone, crosslinked poly(phenylene sulfide sulfone nitrile), sulfonated polystyrene, sulfonated poly(vinyl toluene), cross-linked sulfonated polystyrene, cross-linked sulfonated poly(vinyl toluene), or combinations thereof. An embodiment of the invention is one, any or all of prior embodiments in this paragraph up through the first embodiment in this paragraph wherein the polycation polymer comprises an amine based polycation polymer, a pyridine based polycation polymer, a positively charged polysaccharide polycation polymer, or combinations thereof. An embodiment of the invention is one, any or all of prior embodiments in this paragraph up through the first embodiment in this paragraph wherein the polyanion polymer comprises sulfonated poly(ether ether ketone), sulfonated polyether sulfone, sulfonated polyphenyl sulfone, sulfonated poly(2,6-dimethyl-1,4-phenylene oxide), sulfonated poly(4-phenoxybenzoyl-1,4-phenylene), sulfonated polyphenylene oxide, sulfonated poly(phenylene), sulfonated poly(phthalazinone), sulfonated polystyrene, sulfonated poly(vinyl toluene), poly(acrylic acid), poly (vinylsulfonic acid sodium), poly(sodium phosphate), a negatively charged polysaccharide polyanion polymer selected from the group consisting of sodium alginate, potassium alginate, calcium alginate, ammonium alginate, alginic acid, sodium hyaluronate, potassium hyaluronate, calcium hyaluronate, ammonium hyaluronate, hyaluronic acid, κ-carrageenan, λ-carrageenan, ι-carrageenan, carboxymethyl curdlan, sodium carboxymethyl curdlan, potassium carboxymethyl curdlan, calcium carboxymethyl curdlan, ammonium carboxymethyl curdlan, carboxymethyl cellulose, sodium carboxymethyl cellulose, potassium carboxymethyl cellulose, calcium carboxymethyl cellulose, ammonium carboxymethyl cellulose, pectic acid, or combinations thereof. An embodiment of the invention is one, any or all of prior embodiments in this paragraph up through the first embodiment in this paragraph wherein the polycation polymer comprises polybiguanide, quaternary ammonium polyethylenimine, quaternary ammonium polypropylenimine, quaternary ammonium polyamidoamine (PAMAM), poly(vinylamine hydrochloride) (PVH), poly(allylamine hydrochloride) (PAH), poly(amidoamine hydrochloride), poly(N-isopropylallylamine hydrochloride), poly(N-tert-butylallylamine hydrochloride), poly(N-1,2-dimethylpropylallylamine hydrochloride), poly(N-methylallylamine hydrochloride), poly(N,N-dimethylallylamine hydrochloride), poly(2-vinylpiperidine hydrochloride), poly(4-vinylpiperidine hydrochloride), poly(4-vinylpyridine hydrochloride), poly(diallyldimethylammonium chloride), poly (acrylamide-co-diallyldimethylammonium chloride), poly (diallyl methyl amine hydrochloride), a copolymer of 2-propen-1-amine-hydrochloride with N-2-propenyl-2-propen-1-aminehydrochloride, poly(N-alkyl-4-vinylpyridinium) salt, polylysine, polyornithine, polyarginine, poly (ethylene oxide)-block-poly(vinyl benzyl trimethylammonium chloride), poly(ethylene oxide)-block-poly(l-lysine), poly(2-methacryloyloxyethyl phosphorylcholine methacrylate)-block-poly(vinyl benzyl trimethylammonium chloride), poly[2-(dimethylamino)-ethyl methacrylate, poly[3-(dimethylamino)-propyl methacrylate], poly[2-(dimethylamino)-ethyl methacrylamide], poly [3-(dimethylamino) propyl methacrylamide], poly[2-(trimethylamino)ethyl methacrylate chloride], poly[2-(diethylamino)ethyl methacrylate], poly[2-(dimethylamino) ethyl acrylate], or combinations thereof. An embodiment of the invention is one, any or all of prior embodiments in this paragraph up through the first embodiment in this paragraph wherein the polyelectrolyte multilayer coating has a thickness less than a thickness of the proton exchange membrane layer. An embodiment of the invention is one, any or all of prior embodiments in this paragraph up through the first embodiment in this paragraph further comprising a second polyelectrolyte multilayer coating on the second surface of the proton exchange membrane layer. An embodiment of the invention is one, any or all of prior embodiments in this paragraph up through the first embodiment in this paragraph wherein there are at least two sets of alternating layers of the polycation polymer and the polyanion polymer on the surface of the proton exchange membrane.

A second embodiment of the invention is a catalyst-coated membrane comprising a composite proton exchange membrane comprising a proton exchange membrane layer having a first surface and a second surface; a continuous nonporous organic-inorganic composite coating layer having a first surface and a second surface, the first surface of the continuous organic-inorganic composite coating layer on the first surface of the proton exchange membrane, the continuous organic-inorganic composite coating layer comprising a mixture of inorganic nanoparticles and a hydrophilic ionomer; and a continuous nonporous cross-linked polyelectrolyte multilayer coating on the second surface of the organic-inorganic composite coating layer, the polyelectrolyte multilayer coating comprising alternating layers of a polycation polymer and a polyanion polymer, and wherein the polycation polymer layer is in contact with the continuous organic-inorganic composite coating layer; an anode on a second surface of the continuous polyelectrolyte multilayer coating; and a cathode on the second surface of the proton exchange membrane layer; or a cathode on a second surface of a second continuous polyelectrolyte multilayer coating on the second surface of the proton exchange membrane layer. An embodiment of the invention is one, any or all of prior embodiments in this paragraph up through the second embodiment in this paragraph wherein the anode comprises iridium, platinum, ruthenium, osmium, rhodium, palladium, tin, tungsten, vanadium, cobalt, silver, gold, copper, nickel, molybdenum, iron, chromium, alloys thereof, oxides thereof, carbides thereof, phosphides thereof, or combinations thereof. An embodiment of the invention is one, any or all of prior embodiments in this paragraph up through the second embodiment in this paragraph wherein the cathode comprises platinum, ruthenium, osmium, rhodium, palladium, tin, tungsten, vanadium, cobalt, silver, gold, nickel, molybdenum, iron, copper, chromium, alloys thereof, oxides thereof, carbides thereof, phosphides thereof, or combinations thereof.

A third embodiment of the invention is a method of preparing a composite proton exchange membrane comprising applying a continuous nonporous organic-inorganic composite coating layer directly on a first surface of a proton exchange membrane, the continuous organic-inorganic composite coating layer comprising a mixture of inorganic nanoparticles and a hydrophilic ionomer; and applying a continuous nonporous cross-linked polyelectrolyte multilayer coating directly on a surface of the continuous organic-inorganic composite coating layer, the polyelectrolyte multilayer coating comprising alternating layers of a polycation polymer and a polyanion polymer, wherein the polycation polymer layer is in contact with the continuous organic-inorganic composite coating layer. An embodiment of the invention is one, any or all of prior embodiments in this paragraph up through the third embodiment in this paragraph further comprising applying a second continuous nonporous cross-linked polyelectrolyte multilayer coating directly on a second surface of the proton exchange membrane, the second continuous nonporous cross-linked polyelectrolyte multilayer coating comprising alternating layers of a polycation polymer and a polyanion polymer, wherein the polycation polymer layer is in contact with the proton exchange membrane. An embodiment of the invention is one, any or all of prior embodiments in this paragraph up through the third embodiment in this paragraph further comprising applying an anode on a second surface of the continuous nonporous cross-linked polyelectrolyte multilayer coating; and applying a cathode to a second surface of the proton exchange membrane; or applying an anode on a second surface of the continuous nonporous cross-linked polyelectrolyte multilayer coating; applying a second continuous nonporous cross-linked polyelectrolyte multilayer coating on a second surface of the proton exchange membrane; and applying a cathode to a second surface of the second continuous nonporous cross-linked polyelectrolyte multilayer coating.

Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated.

What is claimed is:

1. A composite proton exchange membrane comprising:
a proton exchange membrane layer having a first surface and a second surface;
a continuous nonporous organic-inorganic composite coating layer having a first surface and a second surface, the first surface of the continuous organic-inorganic composite coating layer on the first surface of the proton exchange membrane, the continuous organic-inorganic composite coating layer comprising a mixture of inorganic nanoparticles and a hydrophilic ionomer; and a continuous nonporous cross-linked polyelectrolyte multilayer coating on the second surface of the organic-inorganic composite coating layer, the polyelectrolyte multilayer coating comprising alternating layers of a polycation polymer and a polyanion polymer, and wherein the polycation polymer layer is in contact with the organic-inorganic composite coating layer.

2. The composite proton exchange membrane of claim 1 wherein the inorganic nanoparticles comprise $CeO_2$, $Ce(OH)_4$, $CeO_2/ZrO_2$, $Ce(OH)_4/ZrO_2$, $ZrO_2$, silica gel, precipitated silica, fumed silica, colloidal silica, or mixtures thereof.

3. The composite proton exchange membrane of claim 1 wherein the inorganic nanoparticles have a size in a range of about 1 nanometer to about 500 nanometers.

4. The composite proton exchange membrane of claim 1 wherein the proton exchange membrane layer thickness is in a range of about 10 micrometers to about 50 micrometers.

5. The composite proton exchange membrane of claim 1 wherein a weight ratio of the inorganic nanoparticles to the hydrophilic ionomer in the continuous organic-inorganic composite coating layer is in a range of 1/300 to 7/10.

6. The composite proton exchange membrane of claim 1 wherein the proton exchange membrane layer comprises a cation exchange polymer or a mixture of a cation exchange polymer and an inorganic filler comprising covalently bonded acidic functional groups.

7. The composite proton exchange membrane of claim 6 wherein the cation exchange polymer comprises a perfluorinated sulfonic acid-based polymer, a perfluorinated carboxylic acid polymer, a sulfonated aromatic hydrocarbon polymer, a cross-linked sulfonated aromatic hydrocarbon polymer, or combinations thereof.

8. The composite proton exchange membrane of claim 1 wherein the ionomer comprises a proton-conductive fluorinated or non-fluorinated polymeric ionomer.

9. The composite proton exchange membrane of claim 8 wherein the proton-conductive fluorinated or non-fluorinated polymeric ionomer comprises a copolymer of tetrafluoroethylene and perfluoro-3,6-dioxa-4-methyl-7-octene-sulfonic acid, a copolymer of tetrafluoroethylene and perfluoro-5-oxa-6-heptene-sulfonic acid, a copolymer of tetrafluoroethylene and perfluoro-4-oxa-5-hexene-sulfonic acid, a copolymer of tetrafluoroethylene and perfluoro-3-oxa-4-pentene-sulfonic acid, a copolymer of perfluoro-3,6-dioxa-4-methyl-7-octene-sulfonic acid and perfluoro(2,2-dimethyl-1,3-dioxole), a copolymer of perfluoro-5-oxa-6-heptene-sulfonic acid and perfluoro(2,2-dimethyl-1,3-dioxole), a copolymer of perfluoro-4-oxa-5-hexene-sulfonic acid and perfluoro(2,2-dimethyl-1,3-dioxole), a copolymer of perfluoro-3-oxa-4-pentene-sulfonic acid and perfluoro(2,2-dimethyl-1,3-dioxole), a copolymer of perfluoro-3,6-dioxa-4-methyl-7-octene-sulfonic acid and perfluoro(2-methylene-4-methyl-1,3-dioxolane), a copolymer of perfluoro-5-oxa-6-heptene-sulfonic acid and perfluoro(2-methylene-4-methyl-1,3-dioxolane), a copolymer of perfluoro-4-oxa-5-hexene-sulfonic acid and perfluoro(2-methylene-4-methyl-1,3-dioxolane), a copolymer of perfluoro-3-oxa-4-pentene-sulfonic acid and perfluoro(2-methylene-4-methyl-1,3-dioxolane), a copolymer of perfluoro-3,6-dioxa-4-methyl-7-octene-sulfonic acid and 2,2,4-trifluoro-5-trifluoromethoxy-1,3-dioxole, a copolymer of perfluoro-5-oxa-6-heptene-sulfonic acid and 2,2,4-trifluoro-5-trifluoromethoxy-1,3-dioxole, a copolymer of perfluoro-4-oxa-5-hexene-sulfonic acid and 2,2,4-trifluoro-5-trifluoromethoxy-1,3-dioxole, a copolymer of perfluoro-3-oxa-4-pentene-sulfonic acid and 2,2,4-trifluoro-5-trifluoromethoxy-1,3-dioxole, sulfonated poly(ether ether ketone) (SPEEK), sulfonated polyether sulfone, sulfonated polyphenyl sulfone, sulfonated poly(2, 6-dimethyl-1,4-phenylene oxide), sulfonated poly(4-phenoxybenzoyl-1,4-phenylene), sulfonated polyphenylene oxide, sulfonated poly(phenylene), sulfonated poly(phthalazinone), cross-linked SPEEK, cross-linked sulfonated polyether sulfone, cross-linked sulfonated polyphenyl sulfone, crosslinked poly(phenylene sulfide sulfone nitrile), sulfonated polystyrene, sulfonated poly(vinyl toluene), cross-linked sulfonated polystyrene, cross-linked sulfonated poly(vinyl toluene), or combinations thereof.

10. The composite proton exchange membrane of claim 1 wherein the polycation polymer comprises an amine based polycation polymer, a pyridine based polycation polymer, a positively charged polysaccharide polycation polymer, or combinations thereof.

11. The composite proton exchange membrane of claim 1 wherein the polyanion polymer comprises sulfonated poly (ether ether ketone), sulfonated polyether sulfone, sulfonated polyphenyl sulfone, sulfonated poly(2,6-dimethyl-1,4-phenylene oxide), sulfonated poly(4-phenoxybenzoyl-1,4-phenylene), sulfonated polyphenylene oxide, sulfonated poly(phenylene), sulfonated poly(phthalazinone), sulfonated polystyrene, sulfonated poly(vinyl toluene), poly(acrylic acid), poly(vinylsulfonic acid sodium), poly(sodium phosphate), a negatively charged polysaccharide polyanion polymer selected from the group consisting of sodium alginate, potassium alginate, calcium alginate, ammonium alginate, alginic acid, sodium hyaluronate, potassium hyaluronate, calcium hyaluronate, ammonium hyaluronate, hyaluronic acid, κ-carrageenan, λ-carrageenan, ι-carrageenan, carboxymethyl curdlan, sodium carboxymethyl curdlan, potassium carboxymethyl curdlan, calcium carboxymethyl curdlan, ammonium carboxymethyl curdlan, carboxymethyl cellulose, sodium carboxymethyl cellulose, potassium carboxymethyl cellulose, calcium carboxymethyl cellulose, ammonium carboxymethyl cellulose, pectic acid, or combinations thereof.

12. The composite proton exchange membrane of claim 1 wherein the polyelectrolyte multilayer coating has a thickness less than a thickness of the proton exchange membrane layer.

13. The composite proton exchange membrane of claim 1 further comprising a second polyelectrolyte multilayer coating on the second surface of the proton exchange membrane layer.

14. The composite proton exchange membrane of claim 1 wherein there are at least two sets of alternating layers of the polycation polymer and the polyanion polymer on the surface of the proton exchange membrane.

15. A catalyst-coated membrane comprising:
   a composite proton exchange membrane comprising:
   a proton exchange membrane layer having a first surface and a second surface;
   a continuous nonporous organic-inorganic composite coating layer having a first surface and a second surface, the first surface of the continuous organic-inorganic composite coating layer on the first surface of the proton exchange membrane, the continuous organic-inorganic composite coating layer comprising a mixture of inorganic nanoparticles and a hydrophilic ionomer; and
   a continuous nonporous cross-linked polyelectrolyte multilayer coating on the second surface of the organic-inorganic composite coating layer, the polyelectrolyte multilayer coating comprising alternating layers of a polycation polymer and a polyanion polymer, and wherein the polycation polymer layer is in contact with the organic-inorganic composite coating layer;
   an anode on a second surface of the continuous polyelectrolyte multilayer coating; and
   a cathode on the second surface of the proton exchange membrane layer; or a cathode on a second surface of a second continuous polyelectrolyte multilayer coating on the second surface of the proton exchange membrane layer.

16. The catalyst coated membrane of claim 15 wherein the anode comprises iridium, platinum, ruthenium, osmium, rhodium, palladium, tin, tungsten, vanadium, cobalt, silver, gold, copper, nickel, molybdenum, iron, chromium, alloys thereof, oxides thereof, carbides thereof, phosphides thereof, or combinations thereof.

17. The catalyst coated membrane of claim 15 wherein the cathode comprises platinum, ruthenium, osmium, rhodium, palladium, tin, tungsten, vanadium, cobalt, silver, gold, nickel, molybdenum, iron, copper, chromium, alloys thereof, oxides thereof, carbides thereof, phosphides thereof, or combinations thereof.

18. A method of preparing a composite proton exchange membrane comprising:
   applying a continuous nonporous organic-inorganic composite coating layer directly on a first surface of a proton exchange membrane, the continuous nonporous organic-inorganic composite coating layer comprising a mixture of inorganic nanoparticles and a hydrophilic ionomer; and
   applying a continuous nonporous crosslinked polyelectrolyte multilayer coating directly on a surface of the continuous organic-inorganic composite coating layer, the polyelectrolyte multilayer coating comprising alternating layers of a polycation polymer and a polyanion polymer, wherein the polycation polymer layer is in contact with the proton exchange membrane.

19. The method of claim 18 further comprising:
   applying a second continuous nonporous cross-linked polyelectrolyte multilayer coating directly on a second surface of the proton exchange membrane, the second continuous nonporous cross-linked polyelectrolyte multilayer coating comprising alternating layers of a polycation polymer and a polyanion polymer, wherein the polycation polymer layer is in contact with the proton exchange membrane.

20. The method of claim 18 further comprising:
   applying an anode on a second surface of the continuous nonporous cross-linked polyelectrolyte multilayer coating; and applying a cathode to a second surface of the proton exchange membrane;
   or
   applying an anode on a second surface of the continuous nonporous cross-linked polyelectrolyte multilayer coating; applying a second continuous nonporous cross-linked polyelectrolyte multilayer coating on a second surface of the proton exchange membrane; and applying a cathode to a second surface of the second continuous nonporous cross-linked polyelectrolyte multilayer coating.

* * * * *